US006129802A

United States Patent [19]

Key

[11] Patent Number: 6,129,802

[45] Date of Patent: Oct. 10, 2000

[54] ROTATABLE LABEL SYSTEM AND METHOD OF CONSTRUCTING SAME

[75] Inventor: Stephen M. Key, Oakdale, Calif.

[73] Assignee: Stephen Key Design, LLC, Oakdale, Calif.

[21] Appl. No.: 09/187,299

[22] Filed: Nov. 5, 1998

[51] Int. Cl.$^{7}$ .......... B32B 31/00

[52] U.S. Cl. .......... 156/229; 156/277; 40/306; 40/310; 40/506

[58] Field of Search .......... 156/84, 85, 86, 156/229, 277; 40/306, 310, 506

[56] References Cited

U.S. PATENT DOCUMENTS

| | | | |
|---|---|---|---|
| 736,035 | 8/1903 | Stevenson . | |
| 1,064,576 | 6/1913 | Washburn . | |
| 1,312,611 | 8/1919 | Chess . | |
| 1,334,031 | 3/1920 | Hahn . | |
| 1,387,625 | 8/1921 | Stein . | |
| 1,486,313 | 3/1924 | Van Antwerp . | |
| 2,013,616 | 9/1935 | Rettenmeyer | 220/1 |
| 2,129,364 | 9/1938 | Simons et al. | 283/8 |
| 2,441,607 | 5/1948 | Walls | 46/13 |
| 2,468,000 | 4/1949 | Taylor | 273/143 |
| 2,504,076 | 4/1950 | Lindblom | 40/68 |
| 2,706,464 | 4/1955 | North | 116/121 |
| 2,739,564 | 3/1956 | North | 116/121 |
| 2,844,893 | 7/1958 | Keller | 40/4 |
| 2,860,431 | 11/1958 | Barnum | 40/61 |
| 2,931,657 | 4/1960 | Lewis | 273/155 |
| 2,935,814 | 5/1960 | Freeze | 46/35 |
| 2,971,283 | 2/1961 | Parker | 40/334 |
| 3,278,182 | 10/1966 | Lescher | 272/8 |
| 3,374,911 | 3/1968 | White | 215/8 |
| 3,488,880 | 1/1970 | Taylor | 46/24 |
| 3,542,229 | 11/1970 | Beyerlein et al. | 215/1 |
| 3,604,584 | 9/1971 | Shank | 215/12 R |
| 3,733,002 | 5/1973 | Fujio | 215/12 R |
| 3,960,713 | 6/1976 | Carey | 206/534 |
| 4,044,889 | 8/1977 | Orentreich et al. | 206/459 |
| 4,203,240 | 5/1980 | Goodwin | 40/310 |
| 4,381,615 | 5/1983 | Lonsmin | 40/334 |
| 4,405,045 | 9/1983 | Villa-Real | 206/534 |
| 4,505,497 | 3/1985 | Katzman | 283/81 |
| 4,567,681 | 2/1986 | Fumei | 40/310 |
| 4,658,974 | 4/1987 | Fujita et al. | 215/12 R |
| 4,724,973 | 2/1988 | Shah | 215/246 |
| 4,877,119 | 10/1989 | Hosking | 206/459 |
| 5,076,613 | 12/1991 | Kovacs | 283/106 |
| 5,154,448 | 10/1992 | Griffin et al. | 283/102 |
| 5,324,559 | 6/1994 | Brombacher | 428/40 |
| 5,342,093 | 8/1994 | Weernink | 285/81 |
| 5,403,636 | 4/1995 | Crum | 428/40 |
| 5,809,674 | 9/1998 | Key | 40/306 |
| 5,884,421 | 3/1999 | Key | 40/306 |

FOREIGN PATENT DOCUMENTS

| | | | |
|---|---|---|---|
| 85214 | 3/1958 | Denmark . | |
| 0285514 | 10/1988 | European Pat. Off. | G09F 3/02 |
| 965522 | 9/1950 | France . | |
| 1114750 | 12/1955 | France . | |
| 1347102 | 11/1963 | France . | |
| 2460260 | 1/1981 | France | B65D 25/36 |
| 2677786 | 12/1992 | France | G09F 3/02 |
| 327286 | 7/1935 | Italy . | |

*Primary Examiner*—James Sells
*Attorney, Agent, or Firm*—Carr & Ferrell LLP; Susan Yee

[57] ABSTRACT

A system and method are disclosed for attaching a radially expandable rotatable label to a container. The expandable rotatable label is radially expanded and then longitudinally advanced over the container. After being expanded, the expandable label is permitted to contract into a tight, rotatable relationship with the container. The expandable rotatable label is preferably adapted with a transparent window portion to permit viewing of indicia disposed underneath the rotatable label. By rotating the expandable label relative to the container, a user can view written indicia disposed on the container or on an inner label affixed to the container.

33 Claims, 10 Drawing Sheets

ROTATABLE LABEL SYSTEM AND METHOD OF CONSTRUCTING SAME

CROSS-REFERENCE WITH RELATED PATENTS AND APPLICATIONS

The present application is related to and incorporates by reference the following co-owned U.S. patents and applications therefor: U.S. Pat. No. 5,809,674 issued Sep. 22, 1998, for an invention entitled "Apparatus and Method for Increasing an Effective Information Carrying Surface Area on a Container"; U.S. patent application Ser. No. 08/741,607 filed on Oct. 31, 1996 entitled "Apparatus and Method for Constructing a Rotatable Label Device" U.S. Pat. No. 5,884, 421; and U.S. patent application Ser. No. 09/126,010 filed on Jul. 29, 1998 entitled "Rotating Label System and Method."

BACKGROUND OF THE INVENTION

1. Field of the Invention

The present invention relates generally to rotatable labels and more particularly to a rotatable label system and method for constructing same.

2. Description of the Background Art

Many consumer product containers are labeled with various types of information. This information may include, for example, product directions for use, warnings, dosage amounts, ingredients, advertisements, company logos, and other artwork. Such information is typically presented on a label wrapped around the container or is disposed directly on the container. In many instances, however, the available space on a single label is insufficient to display all of the information a product manufacturer may want to present to the consumer.

To provide additional space for the presentation of information on a given container, it has been proposed that a rotatable outer label be positioned around a container having an inner label or indicia imprinted on the container outer surface. The outer label typically has a transparent portion, and by rotating the outer label relative to the container, the inner label or container surface can be viewed through the transparent portion. Such a construction permits information to be displayed on both the outer label and the inner label or container surface. This label configuration substantially increases the available space upon which information may be presented.

Despite the advantages of having a rotatable outer label on a container, it has been impractical to employ rotatable outer labels due to the relatively high cost and difficulty of applying such a rotatable label to a container. One significant difficulty has been applying such a rotatable label to a container in an efficient and rapid manner. Indeed, conventional labeling machines and methods do not provide for the efficient or rapid application of a rotatable label to a container.

Another limitation of prior rotatable label systems has been the cost of applying the rotatable labels to containers, particularly on a mass production scale. Conventionally, labels are applied to containers by applying an adhesive to either the label or the container. This manner of application yields a label that is fixed, and not rotatable, relative to the container, lience, label application methods which utilize an adhesive to secure labels to containers have been problematic because of the need for the rotatable labels to rotate about, and not be permanently affixed to the associated containers.

Consequently, a need exists to provide a rotatable label system and method by which a rotatable label may be cost-effectively and rapidly mounted on a container without preventing the label from being rotatable relative to the container. Additionally, a need exists to provide an effective and efficient manner of mounting a rotatable label to a container utilizing conventional label application machinery.

SUMMARY OF THE INVENTION

The present invention overcomes or substantially alleviates prior problems associated with the provision of a rotatable label. In general, the present invention provides a container having an inner label or written indicia disposed directly thereon and a radially expandable rotatable outer label having a transparent portion. The outer label is concentric to and rotatable relative to the container. Written indicia may be disposed on the inner label or directly on the container. The outer label also has written indicia disposed thereon. By rotating the outer label relative to the container, written indicia on the inner label or on the container surface is visible through the transparent portion of the outer label.

The outer label is rotatably secured about the container by radially stretching the label and longitudinally advancing the outer label over the container. Advantageously, once the outer label is in place, the outer label is allowed to radially contract to tightly conform to and rotatably fit about the container.

The present system and method for securing a rotatable label about a container permits a rotatable label to be cost-effectively attached to a container using conventional label application machinery. The outer labels formed according to the present invention are printed on a flat piece of a resilient material, such as polyethylene. The ends of each flat piece are then welded together to form tubular-shaped, radially expandable labels. The process of labeling a container with a radially expandable rotatable label, as briefly discussed above, does not require any adhesive. Thus, conventional sleeve labeling machinery with labeling rates of up to about 800 bottles per minute can be used to implement the present invention (as compared to other labeling systems, which typically label about 200 bottles per minute).

In additional to the high rate of application possible with the present invention, the cost of providing a rotatable label according to the present invention is significantly lower than conventional systems. Indeed, some embodiments of the present radially expandable label can be produced and affixed to a container for about one-tenth the cost of conventional adhesive labels.

Accordingly, the present invention provides a rotatable label device that may be cost effectively constructed and which permits written indicia disposed directly on a container or on an inner label to be viewed through a transparent region of an outer rotatable label. Additionally, the present invention provides a considerable increase in available surface area for the presentation of written indicia on a container without substantially increasing the cost of the labeled container. Other advantages and features of the present invention will be apparent from the drawings and detailed description as set forth below.

DETAILED DESCRIPTION OF THE PREFERRED EMBODIMENT

Figure 1A:
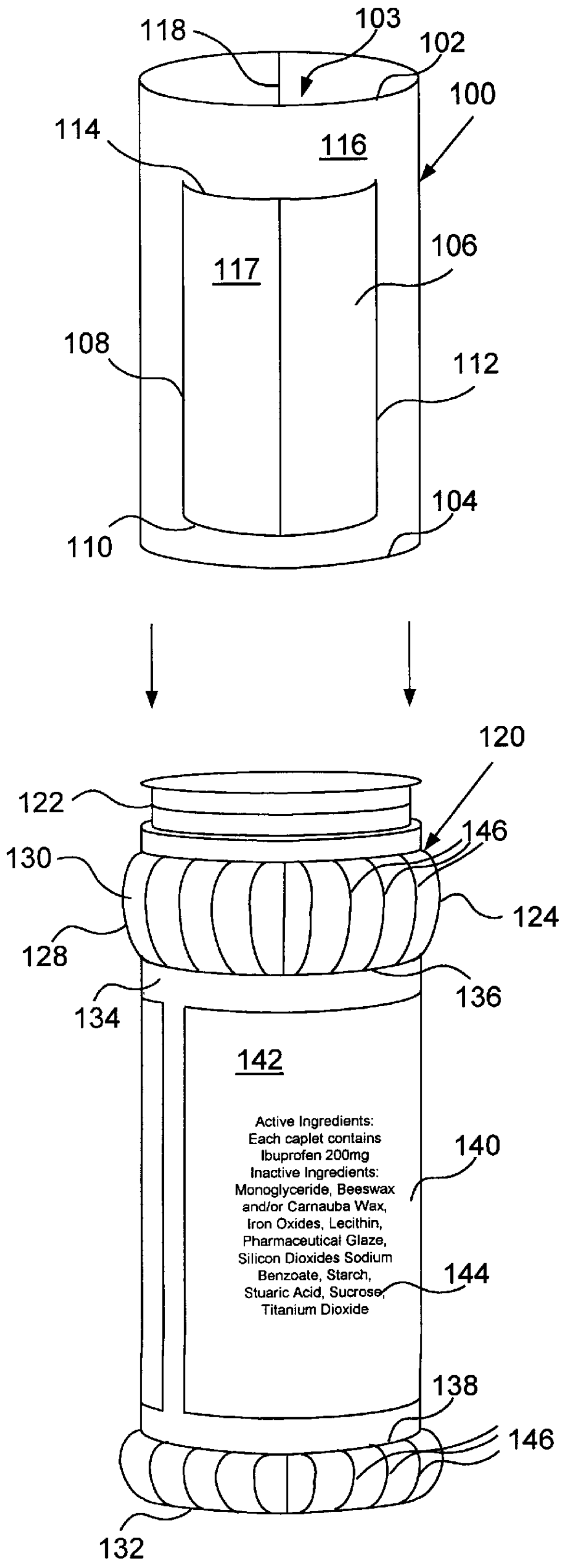
FIG. 1A is a perspective view of one embodiment of a radially expandable rotatable label and a container, according to the present invention.

FIG. 1A illustrates one embodiment of a radially expandable rotatable label 100 and a container 120 according to the present invention. As shown, the radially expandable rotatable label or shell 100 is an annular wall or tube having a top edge 102 and a bottom edge 104. Thus, the rotatable label 100 defines a chamber 103.

The radially expandable rotatable label 100 also includes a transparent window 106. The transparent window 106 is defined by window edges 108, 110, 112, and 114. The transparent window 106 is a transparent area of the label 100. Preferably, no written indicia is disposed within the transparent window 106 to permit unobstructed viewing there through. As discussed in more detail below, the transparent window 106 allows a container recessed surface 134 or an inner label 140 of the container 120 to be visible through the radially expandable rotatable label 100.

The radially expandable rotatable label 100 is advantageously formed from a flat sheet of resilient, selectively expandable material, which after being printed is configured into an annular wall or tube. In one embodiment, the radially expandable rotatable label 100 is formed of polyethylene. Those skilled in the art will appreciate that other resilient selectively expandable materials may also be employed. After written indicia has been printed on the flat sheet of resilient material, the ends are then welded together along label seam 118 to form the tubular-shaped radially expandable rotatable label 100. Although the label scam 118 is shown positioned directly opposite the transparent window 106 in FIG. 1A, the label seam 118 may be located elsewhere relative to the transparent window 106.

FIG. 1A also illustrates the container 120. As shown, the container 120 includes a cap 122 removably secured to a body 124. The body 124 has an exterior surface 128 that includes a top label panel 130, a bottom label panel 132, and the recessed surface 134 interposed between the top and bottom label panels 130 and 132, respectively. As discussed below in connection with FIG. 3, the rotatable label 100 is positioned between the top and bottom label panels 130 and 132, which limit the longitudinal displacement of the rotatable label 100 relative to the container 120, thus preventing the rotatable label 100 from slipping off the container 120.

The top label panel 130, as shown in FIG. 1A, includes an annular edge 136 that intersects with the recessed surface 134. Similarly, the bottom label panel 132 includes an annular edge 138 that intersects with the recessed surface 134. In this configuration, as discussed above, the label panels 132 and 134 limit longitudinal movement of the rotatable label 100 along the longitudinal axis of the container 120. In particular, the rotatable label 100 is maintained between the annular edge 136 and the annular edge 138 of the label panels 130 and 132 respectively.

Advantageously, the exterior surface 128 of the top and bottom label panels 130 and 132 are textured and include gripping elements 146 to assist a user in gripping the container 120 while rotating the label 100 relative to the container 120. As shown, the gripping elements 146 are illustrated as vertical grooves formed on the exterior surface 128 of the top and bottom label panels 130 and 132. Alternatively, the gripping elements 146 could comprise raised elements. Those skilled in the art will appreciate that the gripping elements 146 may comprise depressions or protrusions of a variety of shapes, sizes, and patterns which give increased friction to the exterior surface 128 of the top and bottom label panels 130 and 132.

Although FIG. 1A shows the container 120 as having label panels 130 and 132, those skilled in the art will recognize that other structures beside the label panels 130 and 132 may be employed to longitudinally maintain the rotatable label 100 on the container. For example, the container 120 could include top and bottom increased diameter portions with the rotating label 100 rotatably positioned and longitudinally maintained there between. Other elevated elements or structures in a raised relationship with the recessed surface 134 could also be used to longitudinally maintain the rotatable label 100 on the container 120. Some of these alternate elevated elements are discussed below in conjunction with FIGS. 6A and 6B. These elevated elements may include tactile printing or other protrusions disposed on the exterior surface 128 of the container 120 or on an inner label 140.

Furthermore, FIG. 1A illustrates the inner label 140 affixed to the container recessed surface 134 between the top and bottom annular edges 136 and 138 of the label panels 130 and 132 respectively. The inner label 140 is shown as having an inner label front surface 142 with inner label written indicia 144 disposed thereon. The inner label written indicia 144 may include text, graphics, artwork, and the like. Moreover, the information conveyed by the inner label indicia 144 may include, for example, product directions for use, warnings, dosage amounts, ingredients, advertisements, artwork, company logos, and nutritional data. Those skilled in the art will appreciate that the written indicia 144 may alternatively or additionally be disposed directly on the recessed surface 134.

Figure 1B:
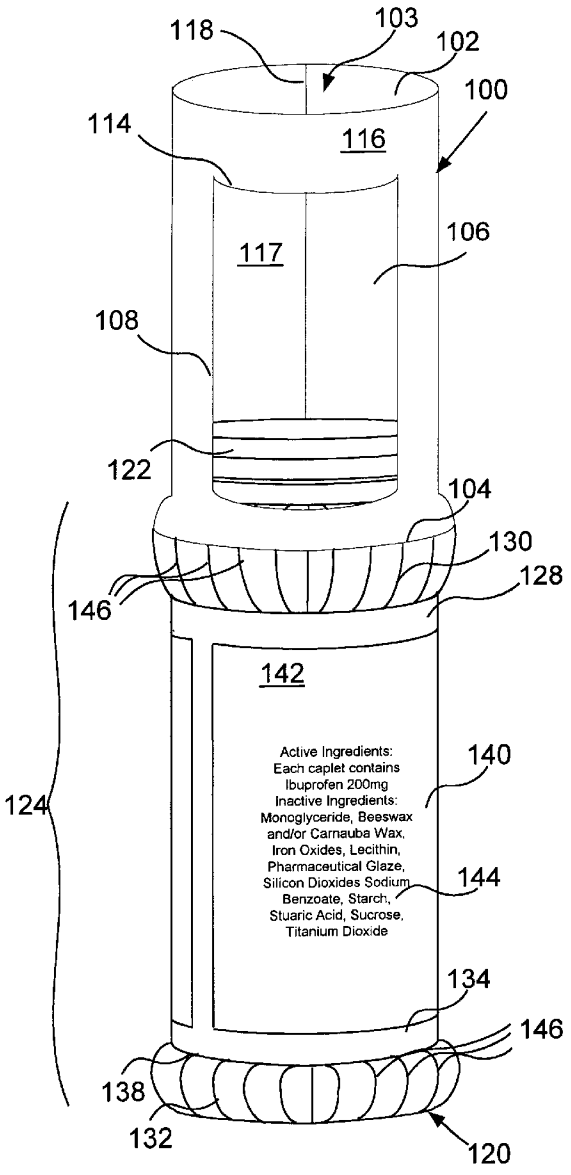
FIG. 1B is a perspective view of the label and container of FIG. 1A with the rotatable label partially advanced over the container.

FIG. 1B shows the radially expandable rotatable label 100 partially advanced longitudinally over a top portion of the container 120. The bottom edge 104 of the rotatable label 100 is radially expanded or stretched to accommodate the top label panel 130. As illustrated, the cap 122 is positioned within the chamber 103 and is visible through transparent window 106.

Figure 1C:
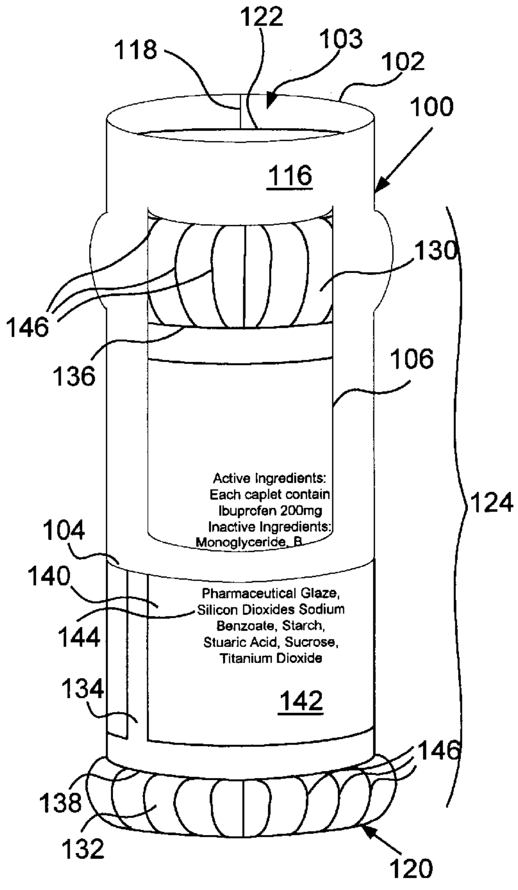
FIG. 1C is a perspective view of the label and container of FIG. 1A with the rotatable label further advanced over the container.

FIG. 1C shows the rotatable label 100 further advanced along the longitudinal axis of container 120. As illustrated, the rotatable label 100 is positioned approximately half way over the container 120 such that a portion of the written indicia 144 is covered by the rotatable label 100 and a portion of the written indicia 144 is visible through the transparent window 106.

As the rotatable label 100 advances downward over the body 124 of the container 120, the rotatable label 100 expands and contracts according to location of the rotatable label 100 relative to the container 120. The rotatable label 100 expands as it passes over sections of the container 120 that have a larger circumference than the unstressed circumference of the label 100. Likewise, the rotatable label 100 contracts after passing over a large circumference section of the container to conform to the shape of the container 120.

Figure 3:
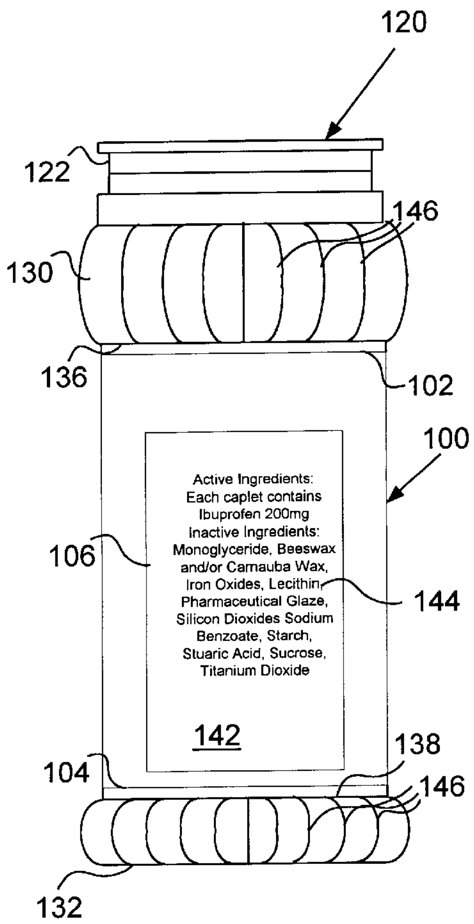
FIG. 3 is a side elevation view of the rotatable label of FIGS. 1A and 2A rotatably mounted about the container, according to the present invention.

Lastly, the rotatable label 100 is advanced from the position shown in FIG. 1C to the position shown in FIG. 3. Once the rotatable label 100 is positioned about the recessed surface 134 between the top and bottom label panels 130 and 132 (as shown in FIG. 3), the rotatable label 100 contracts to tightly conform to and rotatably engage the recessed surface 134.

Figure 2A:
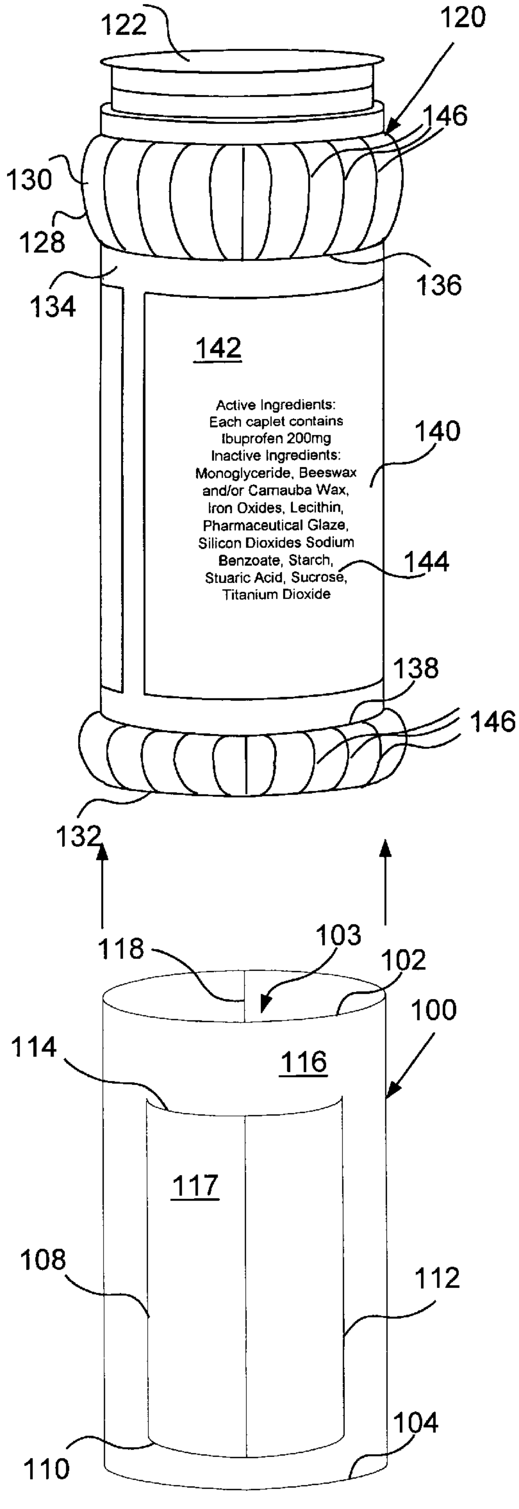
FIG. 2A is a perspective view of a radially expandable rotatable label and a container, according to the present invention.
Figure 2B:
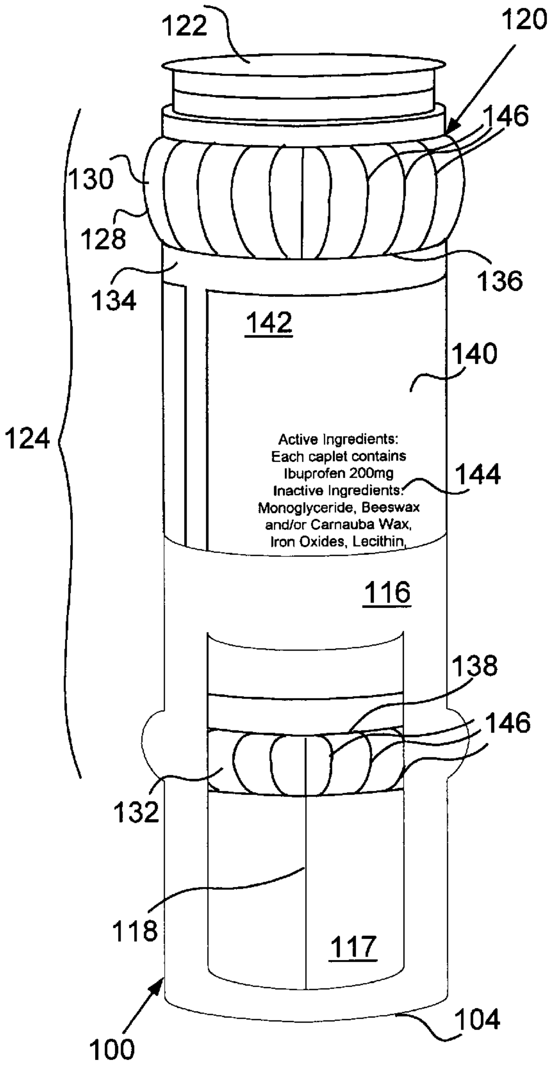
FIG. 2B is a perspective view of the rotatable label and container of FIG. 2A with the label partially advanced over the container.

FIGS. 2A and 2B illustrate an alternative method of affixing the radially expandable rotatable label 100 to the container 120. As shown, lane rotatable label 100 is advanced longitudinally upward over the bottom label panel 132 of the container 120. This method accommodates assembly machine systems which label containers in an upwardly manner instead of in a downwardly manner.

FIG. 2B illustrates rotatable label 100 partially advanced along the longitudinal axis of the container 120. As shown, the rotatable label 100 covers a portion of the written indicia 144 as the label 100 advances up the body 124 of the container 120.

As with the downward advancement method shown in FIGS. 1A through 1C, the rotatable label 100 expands and contracts according the circumference of the container 120. Thus, as the rotatable label 100 passes over the bottom label pane 132, the rotatable label 100 expands radially. However, once the rotatable label 100 is advanced to the position shown in FIG. 3, the label 100 contracts to tightly and rotatably fit about the container 120.

As mentioned above, FIG. 3 shows the radially expandable rotatable label 100 rotatably mounted about the container 120, according to the present invention. As illustrated, the transparent window 106 is aligned with the container 120 such that the written indicia 144 is viewable through the transparent window 106.

With the radially expandable rotatable label 100 mounted on the container 120 as shown in FIG. 3, the label 100 is longitudinally maintained on the container 120 by the top and bottom label panels 130 and 132. In this configuration, the top edge 102 of the rotatable label 100 is prevented from longitudinally moving past the annular edge 136 of the top label panel 130. Similarly, the bottom edge 104 of the rotatable label 100 is prevented from longitudinally moving past the annular edge 138 of the bottom label panel 132.

Figure 4:
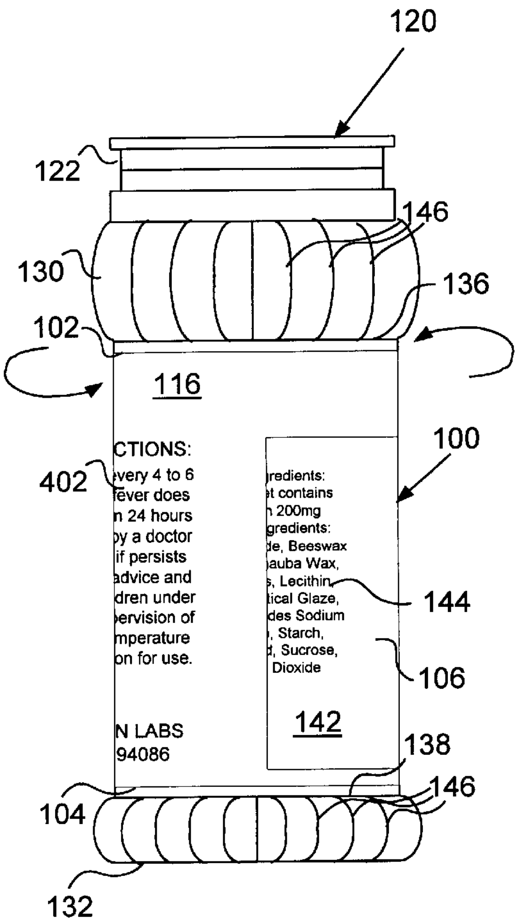
FIG. 4 is a side elevation view of the rotatable label of FIG. 3 rotated relative to the container.

FIG. 4 illustrates the radially expandable rotatable label 100 partially rotated relative to the container 120. By gripping the container 120 at one of the label panels 130 or 132, the gripping elements 146 provide the user with a secure grasp of the container 120 while rotating the label 100 relative to the container 120. As the rotatable label 100 turns, the transparent window 106 rotates relative to the container 120. Thus, the view of the inner label front surface 142 through the transparent window 106 changes according to the rotation of the rotatable label 100 relative to the container 120. In FIG. 4, a portion of the written indicia 144 is not viewable through the transparent window portion 106. The rotatable label front surface 116 also has written indicia 402 disposed thereon.

Additionally, although FIG. 4 shows the rotatable label 100 turning counterclockwise as viewed from above the container 120, the rotatable label 100 may be turned in both clockwise and counterclockwise directions.

Figure 5A:
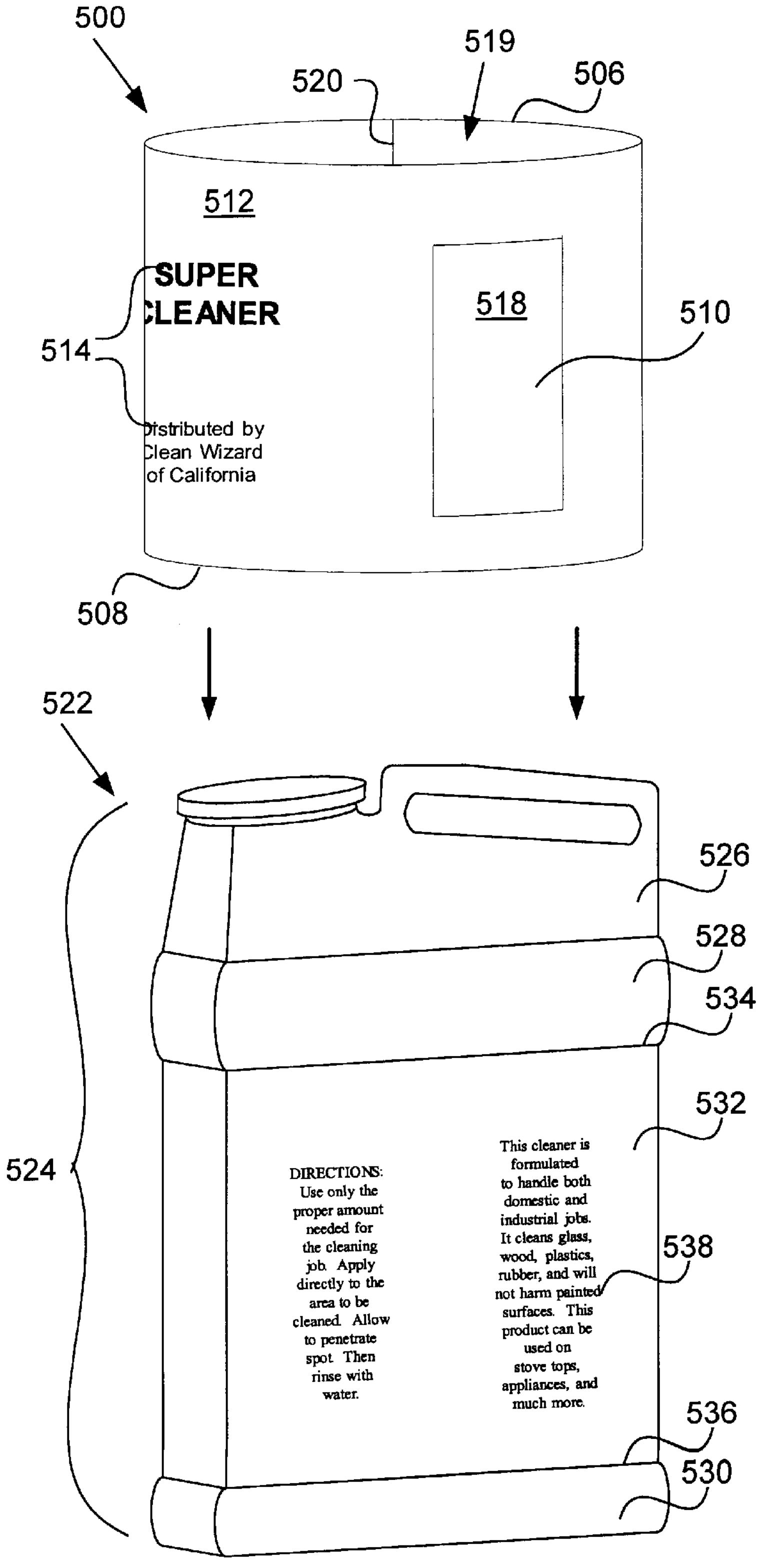
FIG. 5A is a perspective view of another embodiment of a radially expandable rotatable label and a container, according to the present invention.
Figure 5B:
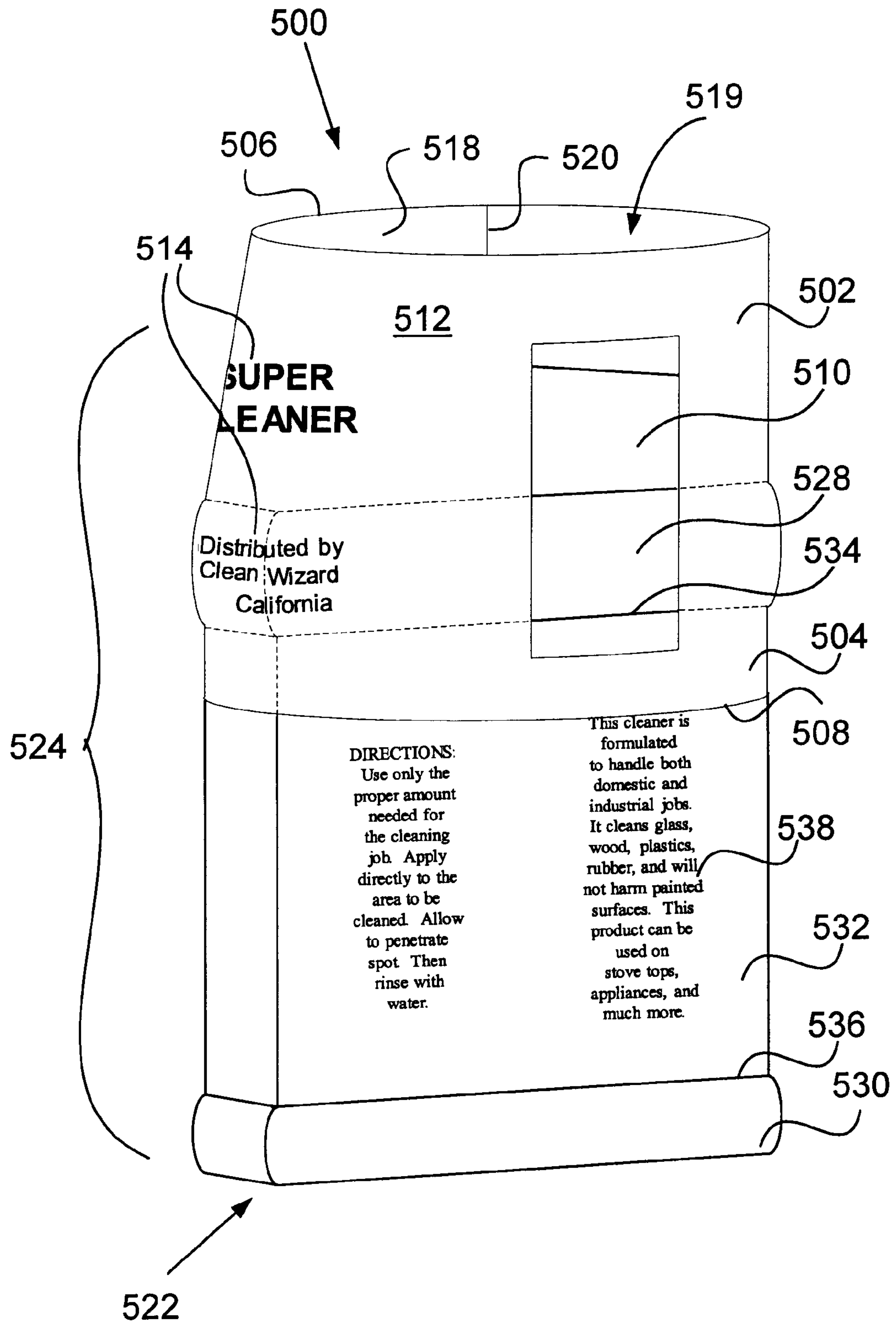
FIG. 5B is a perspective view of the rotatable label and container of FIG. 5A with the label partially advanced over the container.
Figure 5C:
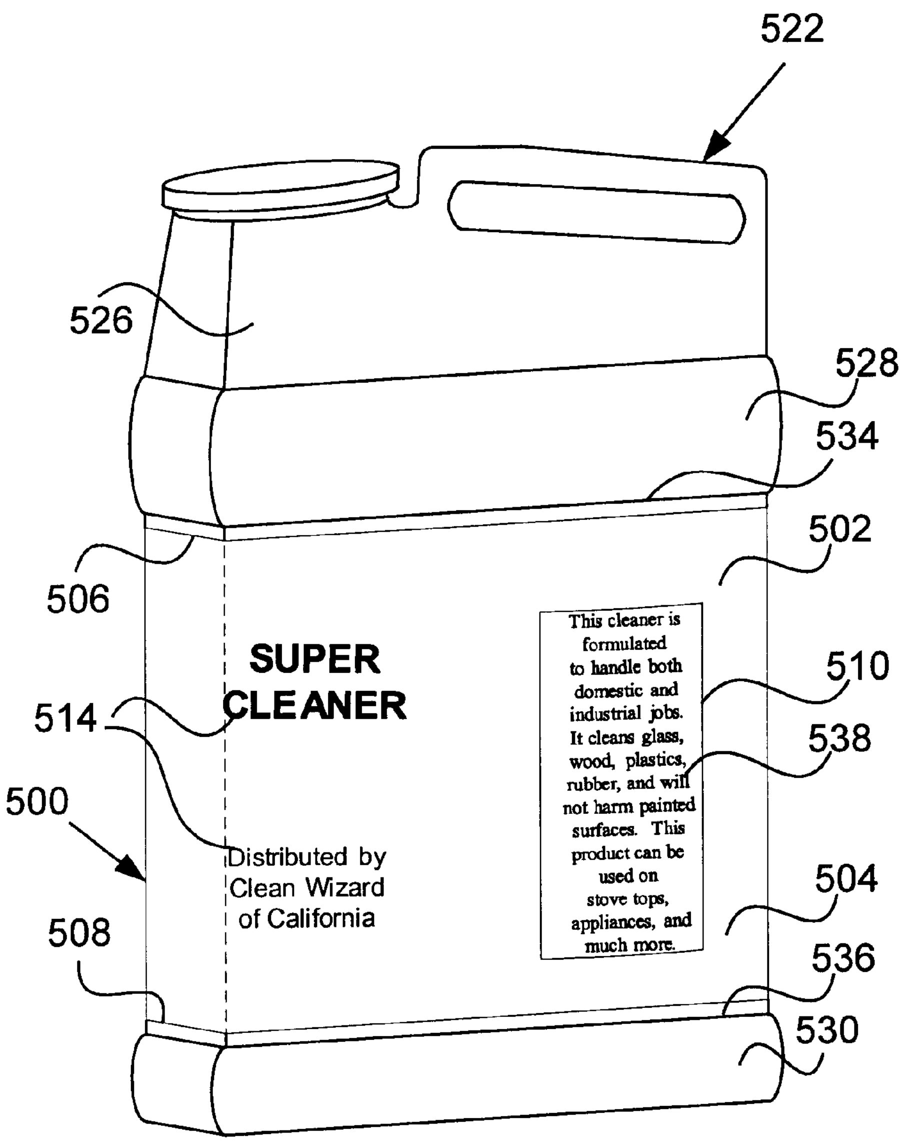
FIG. 5C is a perspective view of the rotatable label of FIG. 5A rotatably mounted about the container, according to the present invention.

FIGS. 5A, 5B, and 5C show another embodiment of a radially expandable rotatable label 500 and a container 522. As shown, a label inside surface 518 defines a chamber 519. The rotatable label 500 further includes top and bottom edges 506 and 508, which define the height of the rotatable label 500. The rotatable label 500 also includes a transparent window 510. The transparent window portion 510 is a transparent area of the label 500 and is preferably void of written indicia.

As with the label 100 discussed above in conjunction with FIG. 1A, the radially expandable rotatable label 500 is advantageously a flat sheet of resilient and selectively expandable material welded along a seam 520 to form an annular or tube-shaped label. Written indicia 514 is printed on a front surface 512 of the rotatable label 500 when the sheet is flat. The welding of the flat sheet ends creates the seam 520, which may be located in various locations relative to the transparent window 518.

FIG. 5A also illustrates the container 522. As shown, portions of the container 522 have substantially rectangular shaped cross-sections, unlike those of the container 120 shown in FIG. 1A and described above, which were circular. In general, the container 500 includes a body portion 524 having an exterior surface 526, a top label panel 528, a bottom label panel 530, and a recessed surface 532 interposed between the top and bottom label panels 528 and 530, respectively. The top label panel 528 includes an annular edge 534 that intersects the recessed surface 532. Similarly, the bottom label panel 530 includes an annular edge 536 that intersects the recessed surface 532. In this configuration, as discussed above, the label panels 528 and 530 limit longitudinal movement of the rotatable label 500 along the longitudinal axis of container 522. In particular, the rotatable label 500 is maintained between the top annular edge 534 and the bottom annular edge 536.

Furthermore, FIG. 5A illustrates the container 522 as having written indicia 538 disposed directly onto the recessed surface 532. Alternatively, the written indicia 538 may be printed on an inner label, which is adhered or otherwise affixed to the recessed surface 532.

FIG. 5B illustrates the rotatable label 500 partially advanced over the container 522. As shown, as the rotatable label 500 advances downwardly over the container 522 from the position shown in FIG. 5A to that shown in FIG. 5B, the rotatable label 500 expands and contracts radially according to the circumference and cross-sectional geometry of the container 522. Thus, as the rotatable label 500 passes over the top label panel 528, the rotatable label 500 expands radially. However, as the rotatable label 500 advances onto the recessed surface 532, the rotatable label 500 contracts back to substantially conform to the circumference and cross-sectional geometry of the recessed surface 532.

FIG. 5C shows the radially expandable rotatable label 500 rotatably mounted about the container 522, according to the present invention. As illustrated, the transparent window 510 is aligned with the container 522 so that a portion of the written indicia 538 is viewable through the transparent window 510. Another portion of written indicia 538 (visible in FIG. 5A) is covered by a portion of the rotatable label 500 that is at least partially opaque. As with the rotatable label 100 of FIG. 1A, the rotatable label 500 is rotatable in both clockwise and counterclockwise directions.

As shown in FIG. 5C, the radially expandable rotatable label 500 is longitudinally maintained about the container 522 by the top and bottom label panels 528 and 530. The top edge 506 of the rotatable label 500 is prevented from advancing past the annular edge 534. In a similar manner, the label bottom edge 508 is prevented from slipping past the annular edge 536 of the bottom label panel 530.

As the embodiment of FIGS. 5A through 5C shows, the rotatable label 500 can be used on a container having rectangular shaped cross-sectioned portions. Those skilled in the art will appreciate that the radially expandable rotatable label 500 of the present invention could also be used on containers having a wide variety of cross-sectiornal shapes.

Figure 6A:
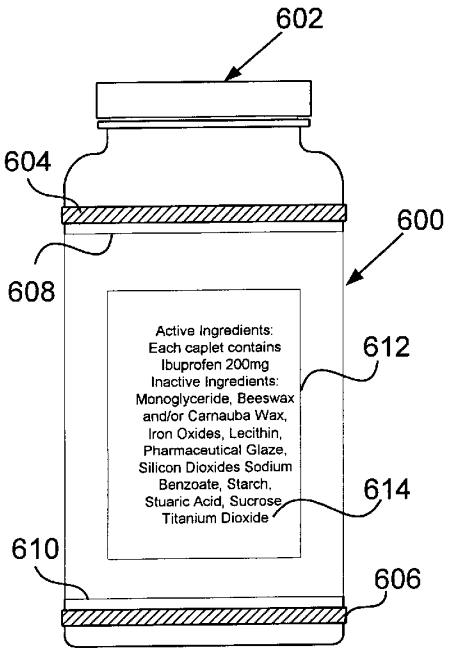
FIG. 6A is a side elevation view of yet another embodiment of a radially expandable rotatable label and a container, according to the present invention.
Figure 6B:
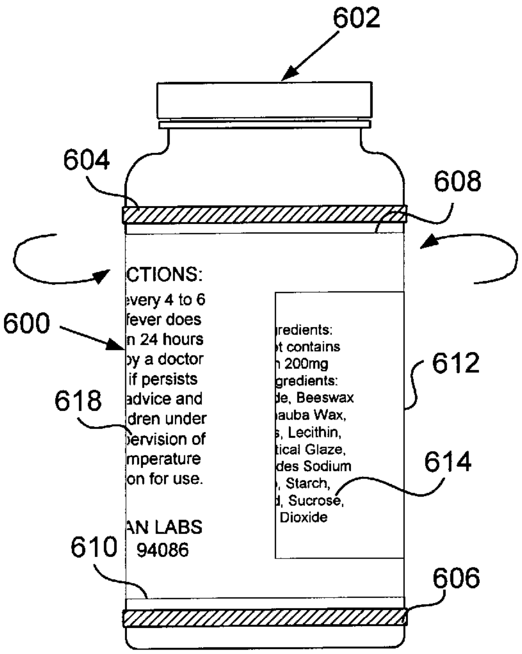
FIG. 6B is side elevation view of the rotatable label and container of FIG. 6A with the rotatable label rotated relative to the container.

FIGS. 6A and 6B show yet another embodiment of a radially expandable rotatable label 600 and a container 602. In this embodiment, there are no label panels located on the container 602. Instead, top and bottom elevated elements 604 and 606 are provided to prevent the rotatable label 600 from sliding off the container 602. The elevated elements 604 and 606 may be structurally provided in a number of ways given they provide a raised structure to limit longitudinal movement of the rotatable label 600 relative to the container 602. Hence, as shown, the elevated elements 604 and 606 may comprise adhesive strips adhered about the container 602. These adhesive strips may have written indicia disposed thereon, such as writings or designs. Furthermore, the elevated elements 604 and 606 do not need to comprise continuous elevated structures. Indeed, the elevated elements 604 and 606 may alternatively comprise intermittent raised elements disposed about the container 602 so as to create protrusions that limit the longitudinal movement of the rotatable label 600 relative to the container 602. Additionally, the elevated elements 604 and 606 may comprise raised lettering or designs formed on the exterior surface of the container 602.

FIG. 6B illustrates the radially expandable rotatable label 600 partially rotated relative to the container 602. As the rotatable label 600 rotates relative to the container 602, the transparent window 612 rotates. Thus, the view of written indicia 614 on the container 602 through the transparent window 612 varies as the rotatable label 600 rotates relative to the container 602. Preferably, the label 600 also includes written indicia 618 disposed on its exterior surface.

As with the embodiments described above, the rotatable label 600 may be turned in both clockwise and counterclockwise directions.

Figure 7:
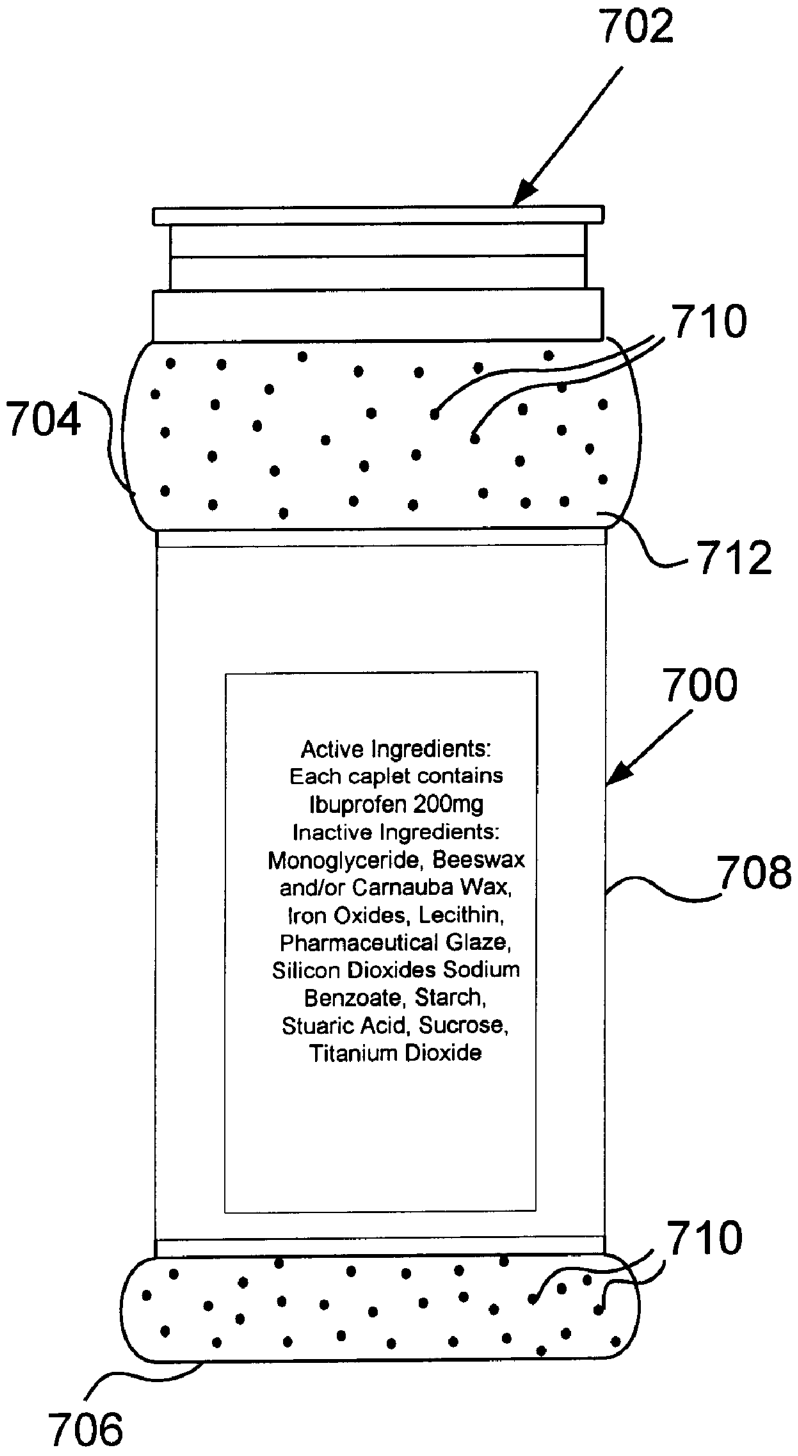
FIG. 7 is a side elevation view of another embodiment of a radially expandable rotatable label and a container, according to the present invention.

FIG. 7 illustrates another embodiment of a radially expandable rotatable label 700 and container 702. As shown, the container 702 includes a top label panel 704, a bottom label panel 706, and a recessed surface 708 interposed between the top and bottom label panels 704 and 706 respectively. The top and bottom label panels 704 and 706 include a textured surface comprising gripping elements 710. This embodiment of the container 702 displays the gripping elements 710 as tiny circular protrusions extending from an exterior surface 712 of the container 702. Although the gripping elements 710 are shown as being protrusions on the exterior surface 712, the gripping elements 710 may alternatively be depressions in the exterior surface 712 of the container 702. Indeed, those skilled in the art will recognize that other gripping elements 710 may be utilized to increase the coefficient of friction associated with the exterior surface 712 to facilitate secure gripping of the container 702 while rotating the rotatable label 700 relative thereto.

Figure 8:
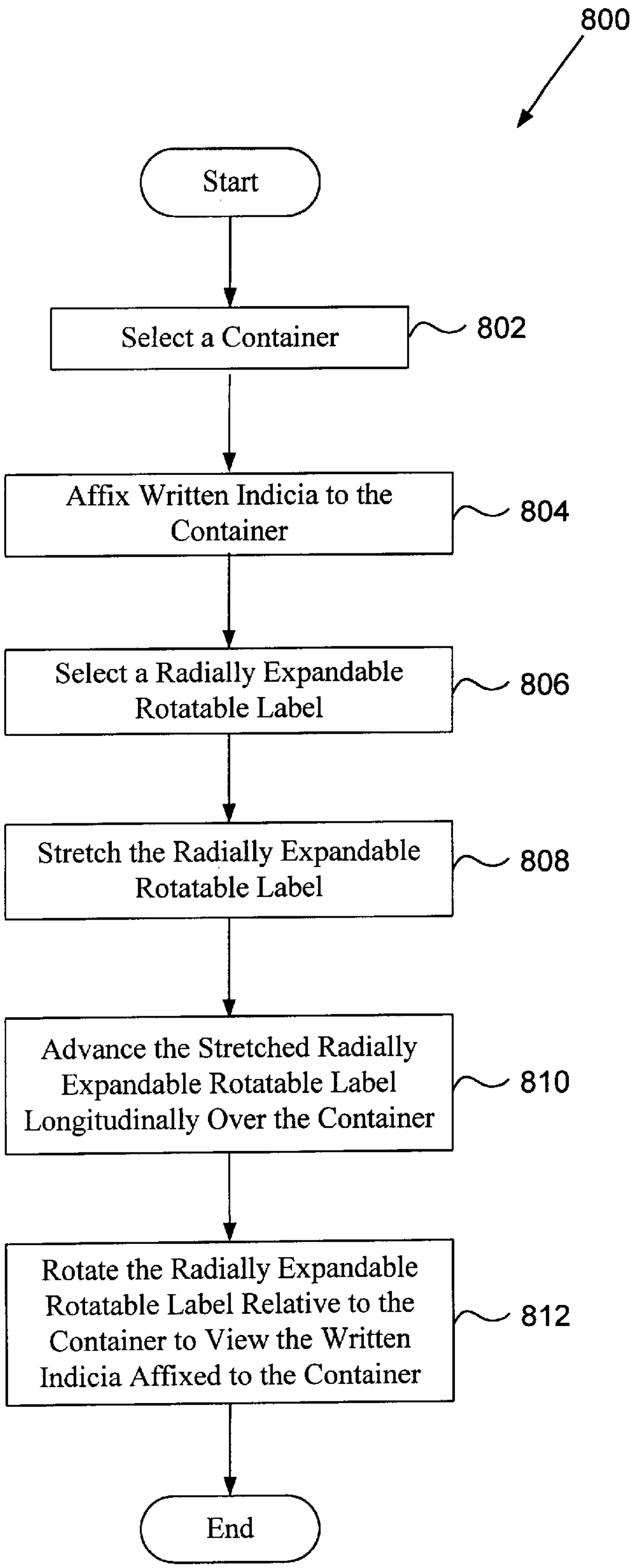
FIG. 8 is a flowchart of a method for affixing and utilizing a radially expandable rotatable label, according to the present invention.

FIG. 8 is a flowchart 800 that illustrates a preferred method for implementing and utilizing a radially expandable rotatable label according to the present invention. Initially in block 802, the manufacturer selects an object or container to receive a rotatable label. As discussed above, the container can have a wide variety of cross-sectional shapes. Additionally, the size of the container can vary.

In block 804, written indicia is affixed to the container. The written indicia may be disposed directly on the exterior surface of the container or it may be printed onto an inner label, which is then affixed to the container.

In block 806, a radially expandable outer label is selected. As described above, the outer label is preferably a tube-shaped label formed of an expandable, resilient material. The circumference of the outer label will largely depend on the container size. The outer label advantageously has a sufficiently large circumference to allow for easy rotation of the label relative to the container once it is placed on the container. That is, the outer label should not be so tightly positioned about on the container that it can not easily be rotated relative to the container. The height of the outer label may depend on the height of the container, the location of any label panels, and/or the location of elevated elements. Finally, the size of the transparent window portion on the outer label is preferably large enough that the written indicia on the inner label or container surface is visible through the transparent window as the label rotates relative to the container.

In block 808, the radially expandable outer label is radially expanded or stretched to accommodate for the increased circumference of the label panels, elevated elements, or curvatures of the container. After the outer label is radially expanded or stretched, the outer label is advanced longitudinally over the container in block 810. As the label passes over curves, protrusions, label panels, etc. of the container, the outer label expands and contracts to substantially conform to the exterior surface of the container.

The rotatable label is advanced over the container until it is located between the label panels, elevation elements or is otherwise correctly positioned about the container. Lastly, in block 812, the rotatable label is rotated relative to the container. The rotation of the rotatable label relative to the container permits the written indicia affixed to the container to be viewed through the transparent window.

The invention has been described above with reference to specific embodiments. It will be apparent to those skilled in the art that various modifications may be made and other embodiments can be used without departing from the broader scope of the invention. Therefore, these and other variations upon the specific embodiments are intended to be covered by the present invention, which is limited only by the appended claims.

What is claimed is:

1. A method for affixing a rotatable label to a container, comprising the steps of:

providing a container;

affixing first written indicia onto the container;

providing a continuous annular radially expandable label;

radially expanding the radially expandable label; and advancing the radially expandable label longitudinally over the container.

2. The method according to claim 1, wherein the step of affixing first written indicia further comprises directly disposing the first written indicia on an exterior surface of the container.

3. The method according to claim 1, wherein the step of affixing first written indicia further comprises disposing the first written indicia on an inner label and affixing the inner label on the exterior surface of the container.

4. The method according to claim 1, wherein the step of providing a radially expandable label further comprises disposing second written indicia on the radially expandable label.

5. The method according to claim 1, wherein the step of providing a radially expandable label further comprises providing a transparent window on the radially expandable label.

6. The method according to claim 1, further comprising permitting the radially expandable label to contract to rotatably engage the container.

7. The method according to claim 1, wherein the step of providing a container further comprises providing top and bottom elevated elements disposed on a container exterior surface, the radially expandable label being rotatably positioned between the top and bottom elevated elements to prevent the radially expandable label from sliding longitudinally off the container.

8. The method according to claim 7, wherein the top and bottom elevated elements further comprise tactile raised printing.

9. The method according to claim 7, wherein the top and bottom elevated elements further comprise labeling strips.

10. A method for affixing a rotatable label to a container, comprising the steps of:

providing a container having top and bottom label panels;

affixing first written indicia onto the container;

providing a continuous annular radially expandable label;

radially expanding the radially expandable label; and advancing the radially expandable label longitudinally over one of the label panels to rotatably secure the radially expandable label between the top and bottom label panels.

11. The method according to claim 10, wherein the step of affixing first written indicia further comprises directly disposing the first written indicia on an exterior surface of the container.

12. The method according to claim 10, wherein the step of affixing first written indicia further comprises disposing the first written indicia on an inner label and affixing the inner label on the exterior surface of the container.

13. The method according to claim 10, wherein the step of providing a radially expandable label further comprises disposing second written indicia on the radially expandable label.

14. The method according to claim 10, wherein the step of providing a radially expandable label further comprises providing a transparent window on the radially expandable label.

15. The method according to claim 10, further comprising permitting the radially expandable label to contract to rotatably engage the container.

16. A rotatable label system; comprising:

an object having top and bottom label panels with a recessed surface disposed between the top and bottom label panels;

a plurality of gripping elements disposed on at least one of the label panels;

first written indicia affixed to the recessed surface;

a radially expandable label rotatably disposed about the object between the top and bottom label panels of the object; and a transparent window formed in the expandable label to permit viewing of the first written indicia through the transparent window as the radially expandable label is rotated relative to the object.

17. The rotatable label system of claim 16, wherein the gripping elements comprise depressions on an exterior surface of at least one label panel.

18. The rotatable label system of claim 17, wherein the depressions on the exterior surface comprise grooves.

19. The rotatable label system of claim 17, wherein the depressions on the exterior surface comprise substantially circular depressions.

20. The rotatable label system of claim 16, wherein the gripping elements comprise protrusions disposed on the exterior surface of at least one label panel.

21. The rotatable label system of claim 20, wherein the protrusions on the exterior surface comprise elongated protruding elements.

22. The rotatable label system of claim 20, wherein the protrusions on the exterior surface comprise substantially circular protrusions.

23. A rotatable label system, comprising:

a radially expandable label comprising a continuous annular wall defining a chamber;

an object rotatable positioned within the chamber, the object having an exterior surface with first written indicia disposed thereon; and a transparent window portion formed in the annular wall to permit viewing of the written indicia disposed on the exterior surface of the object as the object is rotated relative to the radially expandable label.

24. The rotatable label system of claim 1, wherein the first written indicia is directly disposed on the exterior surface of the object.

25. The rotatable label system of claim 1, further comprising an inner label disposed on the object exterior surface, wherein the first written indicia is disposed on the inner label.

26. The rotatable label system of claim 1, wherein the radially expandable label has second written indicia disposed thereon.

27. The rotatable label system of claim 1, further comprising top and bottom elevated elements, the radially expandable label being rotatably positioned between the top and bottom elevated elements to prevent the radially expandable label from sliding longitudinally off the object.

28. The rotatable label system of claim 27, wherein the top and bottom elevated elements further comprise tactile raised printing.

29. The rotatable label system of claim 27, wherein the top and bottom elevated elements further comprise labeling strips.

30. A rotatable label system, comprising:

an object having top and bottom label panels with a recessed surface disposed between the top and bottom label panels;

first written indicia affixed to the recessed surface;

a continuous annular radially expandable label rotatably disposed about the object between the top and bottom label panels of the object; and a transparent window formed in the expandable label to permit viewing of the first written indicia through the transparent window as the radially expandable label is rotated relative to the object.

31. The rotatable label system of claim 30, wherein the first written indicia is disposed on the recessed surface of the object.

32. The rotatable label system of claim 30, further comprising an inner label disposed on the object exterior surface, wherein the first written indicia is disposed on the inner label.

33. The rotatable label system of claim 30, wherein the radially expandable label has second written indicia disposed thereon.

* * * * *